(12) United States Patent
Subbarayalu et al.

(10) Patent No.: US 10,078,562 B2
(45) Date of Patent: Sep. 18, 2018

(54) TRANSACTIONAL DISTRIBUTED LIFECYCLE MANAGEMENT OF DIVERSE APPLICATION DATA STRUCTURES

(71) Applicant: Microsoft Technology Licensing, LLC, Redmond, WA (US)

(72) Inventors: Preetha Lakshmi Subbarayalu, Redmond, WA (US); Gopala Krishna R. Kakivaya, Sammamish, WA (US); Mihail Gavril Tarta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 510 days.

(21) Appl. No.: 14/829,044

(22) Filed: Aug. 18, 2015

(65) Prior Publication Data

US 2017/0052856 A1 Feb. 23, 2017

(51) Int. Cl.
*G06F 17/30* (2006.01)
*G06F 11/20* (2006.01)

(52) U.S. Cl.
CPC .... *G06F 11/2023* (2013.01); *G06F 2201/805* (2013.01)

(58) Field of Classification Search
CPC .................................. G06F 17/30088
USPC ....................... 707/650, 674, 679
See application file for complete search history.

(56) References Cited

U.S. PATENT DOCUMENTS

| | | | |
|---|---|---|---|
| 6,442,620 B1 | 8/2002 | Thatte et al. | |
| 7,010,538 B1* | 3/2006 | Black ............... | G06F 17/30516 707/636 |
| 7,039,663 B1* | 5/2006 | Federwisch ........ | G06F 11/1451 707/707 |
| 7,260,775 B2 | 8/2007 | Christensen et al. | |
| 7,281,207 B2 | 10/2007 | Layman et al. | |
| 7,496,682 B2 | 2/2009 | Layman et al. | |

(Continued)

OTHER PUBLICATIONS

Balakrishnan, et al., "Tango: Distributed Data Structures over a Shared Log", In Proceedings of 24th ACM Symposium on Operating Systems Principles, Nov. 3, 2013, 16 pages.

(Continued)

*Primary Examiner* — Robert Beausoliel, Jr.
*Assistant Examiner* — Alexandria Bromell

(57) ABSTRACT

A state manager provides transactional distributed lifecycle management of a group of different application-level state providers, namely, differently structured application program data structures. The state providers are atomic with respect to one another. The state provider is replicated to one or more secondary nodes of a distributed network. The state providers are persistent despite one or more node operational failures. State provider lifecycle operations include creation of a transactional distributed state provider as a member of a group of different application-level state providers which include differently structured application program data structures, deletion of a previously created transactional distributed state provider, and/or enumeration of any previously created transactional distributed state providers. A given state provider may be read or written by one or more applications. Implementation restrictions and other avoidance conditions are satisfied in particular cases.

21 Claims, 7 Drawing Sheets

(56) References Cited

U.S. PATENT DOCUMENTS

| | | | |
|---|---|---|---|
| 7,743,019 B2* | 6/2010 | Shah | G06F 17/30604 707/610 |
| 7,827,438 B2 | 11/2010 | Tarta | |
| 7,953,752 B2* | 5/2011 | Soules | G06F 17/30994 704/10 |
| 7,991,836 B2 | 8/2011 | Weis | |
| 8,266,111 B2* | 9/2012 | Lin | G06F 17/30362 707/674 |
| 8,352,658 B2 | 1/2013 | Tarta et al. | |
| 8,489,759 B2 | 7/2013 | Parham et al. | |
| 8,533,237 B2 | 9/2013 | Evans et al. | |
| 8,661,063 B2 | 2/2014 | Mason, Jr. et al. | |
| 8,745,038 B2* | 6/2014 | Simitsis | G06Q 10/06 707/602 |
| 8,775,425 B2 | 7/2014 | Gupta et al. | |
| 8,818,964 B2 | 8/2014 | Tevis et al. | |
| 8,996,482 B1* | 3/2015 | Singh | G06F 17/30575 707/698 |
| 9,069,827 B1* | 6/2015 | Rath | G06F 17/30557 707/707 |
| 9,092,561 B2 | 7/2015 | Miao et al. | |
| 9,106,480 B2 | 8/2015 | Tarta et al. | |
| 9,569,634 B1* | 2/2017 | Yanacek | G06F 21/6218 707/707 |
| 9,720,620 B1* | 8/2017 | Wei | G06F 3/0683 707/707 |
| 9,773,007 B1* | 9/2017 | Golden | G06F 12/08 707/707 |
| 2003/0182312 A1* | 9/2003 | Chen | G06F 11/1435 707/707 |
| 2010/0121817 A1* | 5/2010 | Meyer | G06F 17/30893 707/623 |
| 2011/0184915 A1* | 7/2011 | Wu | G06F 17/30575 707/674 |
| 2013/0304694 A1 | 11/2013 | Barreto et al. | |
| 2013/0346365 A1 | 12/2013 | Kan et al. | |
| 2014/0149698 A1* | 5/2014 | Ezra | G06F 3/0614 711/162 |
| 2014/0279869 A1 | 9/2014 | Wu et al. | |
| 2014/0298091 A1* | 10/2014 | Carlen | H04L 65/80 714/15 |
| 2014/0337285 A1 | 11/2014 | Gokhale et al. | |
| 2015/0261443 A1* | 9/2015 | Wei | G06F 3/0604 711/162 |
| 2015/0277856 A1* | 10/2015 | Payne | G06F 7/588 708/255 |
| 2015/0319242 A1* | 11/2015 | Olster | G06F 11/2094 707/634 |
| 2016/0048408 A1* | 2/2016 | Madhu | G06F 11/1458 718/1 |
| 2016/0057219 A1* | 2/2016 | Kore | H04L 67/28 709/248 |
| 2016/0127200 A1* | 5/2016 | Dippenaar | H04L 41/5051 709/224 |
| 2016/0191509 A1* | 6/2016 | Bestler | G06F 3/067 713/163 |
| 2016/0275089 A1* | 9/2016 | Soundararajan | G06F 17/30088 707/707 |
| 2017/0031671 A1* | 2/2017 | Joshi | G06F 8/654 707/707 |
| 2017/0032005 A1* | 2/2017 | Zheng | G06F 17/30088 707/707 |
| 2018/0004804 A1* | 1/2018 | Merriman | G06F 17/30442 707/707 |
| 2018/0047002 A1* | 2/2018 | Vermeulen | G06Q 20/145 707/707 |
| 2018/0096045 A1* | 4/2018 | Merriman | G06F 17/30584 707/707 |
| 2018/0109610 A1* | 4/2018 | Einkauf | H04L 67/1076 707/707 |

OTHER PUBLICATIONS

Li, et al., "ZHT: A Light-weight Reliable Persistent Dynamic Scalable Zero-hop Distributed Hash Table", In Proceedings of IEEE 27th International Symposium on Parallel & Distributed Processing, May 20, 2013, pp. 775-787.

Wei, et al., "iBigTable: Practical Data Integrity for BigTable in Public Cloud", In Proceedings of Third ACM Conference on Data and Application Security and Privacy, Feb. 18, 2013, pp. 341-352.

Totty, et al., "Dynamic Object Management for Distributed Data Structures", In Proceedings of Supercomputing, Nov. 16, 1992, pp. 692-701.

Etchevers, et al., "Reliable Self-Deployment of Cloud Applications", In Proceedings of the 29th Annual ACM Symposium on Applied Computing, Mar. 24, 2014, pp. 1331-1338.

Chang, et al., "Bigtable: A Distributed Storage System for Structured Data", In Journal ACM Transactions on Computer Systems, vol. 26, Issue 2, Jun. 2008, pp. 1-14.

Nirmesh Malviya, et al., "Rethinking Main Memory OLTP Recovery", retrieved from <<http://hstore.cs.brown.edu/papers/voltdb-recovery.pdf>, 2014, pp. 604-615.

* cited by examiner

SECONDARY, FOR EACH REPLICATION OPERATION

PRIMARY, FOR EACH REPLICATION OPERATION

SECONDARY, FOR EACH REPLICATION OPERATION

TRANSACTIONAL DISTRIBUTED LIFECYCLE MANAGEMENT OF DIVERSE APPLICATION DATA STRUCTURES

BACKGROUND

Computer programs are generally built using control flow mechanisms and data structures. Control flow mechanisms direct a computing system's processor(s), not only to control which instructions are executed, but also to control the sequences in which those instructions and instruction blocks are executed. Data structures organize values which are generated or manipulated by the execution of instructions, including input values, intermediate computation values, output values, values which are referenced and/or modified by the control flow mechanisms, and other data.

Because of the demands placed on them in software, data structures are often tailored to particular kinds of data, particular performance goals, and even particular programming preferences. They are sometimes categorized, e.g., as linked lists, tables, arrays, trees, or any of several other categories, but even within a category, much variation occurs, e.g., lists may be singly or doubly linked and list node content varies widely. Moreover, categories can be combined in many ways, e.g., a given data structure might be an array of linked lists, or a tree of tables, or a list of pointers to arrays whose elements include records containing strings, bitflags and callback procedure addresses, and so on.

SUMMARY

Some embodiments are directed to the technical activity of managing the lifecycles of distinct but coordinated application program data structures in a distributed computing environment. Some embodiments are directed to the related technical challenges of transactional distributed lifecycle management of a group of different application-level state providers.

Some embodiments include or utilize a state manager which provides transactional distributed lifecycle management of a group of different application-level state providers, namely, differently structured application program data structures. The state providers may be atomic with respect to one another. Some embodiments replicate the state provider to one or more secondary nodes of the distributed network. The state providers may be persistent despite one or more node operational failures. State provider lifecycle operations may include, for example, (a) creation of a transactional distributed state provider as a member of a group of different application-level state providers which include differently structured application program data structures, (b) deletion of a previously created transactional distributed state provider, and/or (c) enumeration of any previously created transactional distributed state providers.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Acronyms

Figure 1:
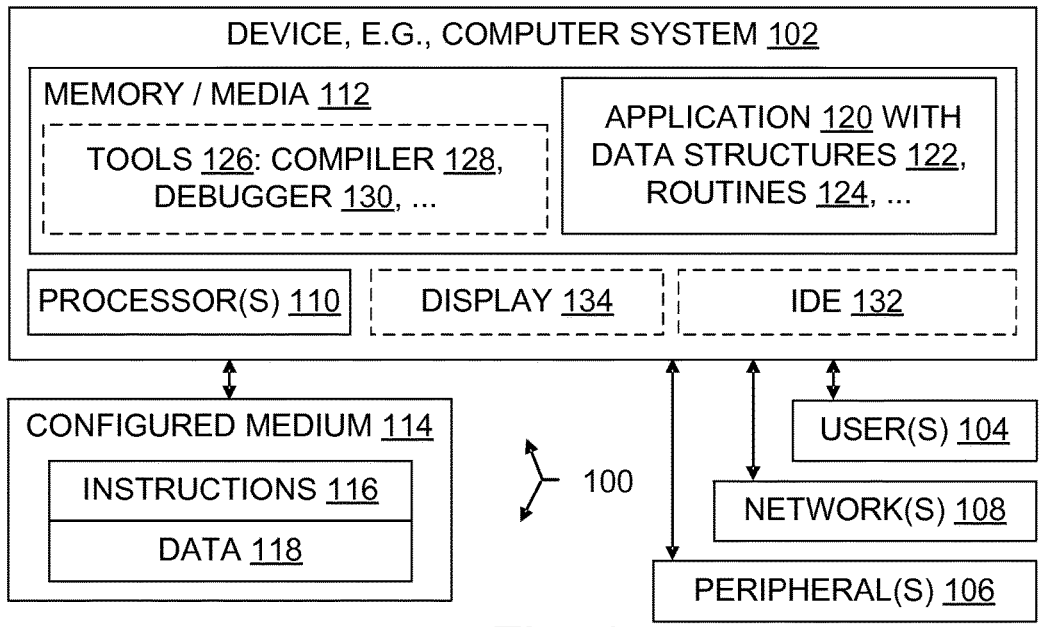
FIG. 1 is a block diagram illustrating a computer system having at least one processor and at least one memory which interact with one another under the control of software which includes applications having data structures, and other items in an operating environment which may be present on multiple network nodes, and also illustrating configured storage medium (as opposed to a mere signal) embodiments.

Some acronyms are defined below, but others may be defined elsewhere herein or require no definition to be understood by one of skill.

ALU: arithmetic and logic unit
API: application program interface
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
IDE: integrated development environment, sometimes also called "interactive development environment"
LSN: logical sequence number
RAM: random access memory
ROM: read only memory SM: state manager
SP: state provider Overview Fundamental building blocks of traditional applications include data structures. Developers map their application's states into a set of data structures and build their application logic on top of those data structures. Furthermore, in a cloud computing environment, it can be helpful for these data structures to be distributed and highly available. Data structures are also referred to herein as state providers. Application writers use multiple data structures for performing the business logic, e.g., a web application may use both a concurrent dictionary and concurrent bag, among many other possibilities. The data structures are coordinated (or treated as if coordinated) by the application software that implements business logic.

Accordingly, under teachings of the present disclosure the application performs operations across the different data structures atomically, to avoid inconsistencies that can cause errors in application output or even crash the application. In a distributed computing environment, data structures may also be replicated and persisted across failovers, so that the application writer can focus on the business logic. Developers may also add new data structures dynamically without interfering with the other data structures. Once these data structures are written, they are re-usable across different applications, according to teachings herein.

In particular, State Manager and State Provider variations described herein address these issues, and provide highly available data structures with the aforementioned desired properties.

Some embodiments described herein may be viewed in a broader context. For instance, concepts such as atomicity, avoidance, diversity, replication, and state may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving atomicity, avoidance, diversity, replication, and/or state are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities such as data structure lifecycle management. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein provide transactional distributed operations on application-level data structures. Third, technical effects provided by some embodiments include persistence of a group of differently-structured application-level data structures past an operational failure. Fourth, some embodiments include technical adaptations such as avoidance of specified implementation choices.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

An "application" (a.k.a. "application program") is code which executes at application-level.

An item is "application-level" when (a) the item is defined in code that is compiled separately from an underlying kernel, (b) the item executes or stores data in user space memory, and/or (c) the item's access to physical computing hardware is scheduled, controlled, or otherwise mediated through operating system software.

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

"Code" means processor instructions, data (which includes constants, variables, and data structures), or both instructions and data.

"Computationally" means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

Two data structures A and B are "differently structured" (that is, they have structural differences) when A has a different number than B of at least one of the following types: associative array, integer-indexed array, record, union, tagged union, set, container, bag, pointer, tree, trie, list, graph, object, Boolean, character, string, integer, floating point, enumeration, hash, queue, stack, table, heap. Differently structured data structures are also said to be "diverse".

An item is "distributed" when the item is replicated onto at least two computing systems which have independent power sources, so that a failure of power to one of the computing systems does not always mean power has also failed to the other computing system(s).

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

"Kernels" include operating systems, hypervisors, virtual machines, BIOS code, and similar hardware interface software.

"Lifecycle management" of an item includes at least creating the item and deleting the item. It may also include modifying the item.

"Linguistically" means by using a natural language or another form of communication which is often employed in face-to-face human-to-human communication. Communicating linguistically includes, for example, speaking, typing, or gesturing with one's fingers, hands, face, and/or body.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

An "operational failure" of a computing node is a failure of the node to meet computing demands placed upon it within a historic average response time for meeting such demands. Operational failures may be caused, for example, by a power failure to the computing node, by a software crash that halts execution of an application and/or kernel running on the computing node, by unusually heavy computing demands placed on it, or by a failure of a hardware component within the computing node.

"Optimize" means to improve, not necessarily to perfect. For example, it may be possible to make further improvements in a program which has been optimized.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Program" is used broadly herein, to include applications, kernels, drivers, interrupt handlers, firmware, state machines, libraries, and other code written by programmers (who are also referred to as developers).

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

A "state provider" (a.k.a. "SP") includes a data structure which contains at least one data value and is accessible to at least one application.

"Transactional" means that multiple operations are performed together on a target, such that either all of the operations have been committed on the target after a transaction succeeds or else none of the operations are committed on the target and the transaction fails.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as assigning, changing, coordinating, creating, deleting, distinguishing, entering, generating, identifying, instantiating, managing, operating, persisting, providing, querying, receiving, registering, replicating, storing, transacting, using, (and assigns, assigned, changes, changed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re *Nuijten* case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 have code which includes data structures 122 and routines 124, for example. Software development tools 126 such as compilers 128 and debuggers 130 assist with software development by producing and/or transforming application code. The application 120, tools 126, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation.

A given operating environment 100 may include an Integrated Development Environment (IDE) 132 which provides a developer with a set of coordinated software development tools 126 such as compilers, source code editors, profilers, debuggers, and so on. In particular, some of the suitable operating environments for some embodiments include or help create a Microsoft® Visual Studio® development environment or a Microsoft .NET® development environment (marks of Microsoft Corporation). Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

In addition to processors 110 (CPUs, ALUs, FPUs, and/or GPUs) in operable communication with at least a portion of the memory, memory/storage media 112, display(s), and battery(ies), an operating environment may also include other hardware, such as buses, power supplies, wired and wireless network interface cards, and accelerators, for instance, whose respective operations are described herein to the extent not already apparent to one of skill.

A display 134 may include one or more touch screens, screens responsive to input from a pen or tablet, or screens which operate solely for output. In addition to processors 110 (CPUs, ALUs, FPUs, and/or GPUs), memory/storage media 112, display(s) 134, and battery(ies), an operating environment may also include other hardware, such as buses, power supplies, wired and wireless network interface cards, and accelerators, for instance, whose respective operations are described herein to the extent not already apparent to one of skill.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

Systems

Figure 2:
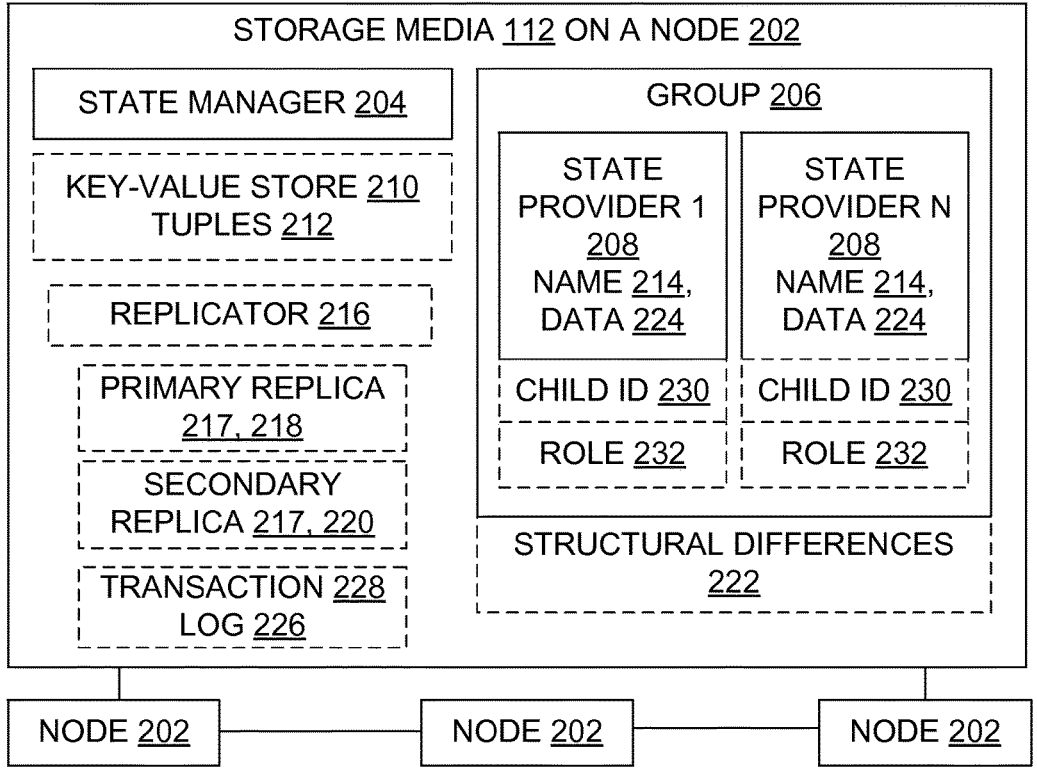
FIG. 2 is a block diagram illustrating aspects of transactional distributed lifecycle management of diverse application data structures in an example architecture.

FIG. 2 illustrates aspects of an architecture which is suitable for use with some embodiments. The illustrated architecture includes nodes 202, each of which includes one or more devices 102, and which collectively with their constituent hardware and software form a distributed computing system 102. FIG. 2 shows a ring topology, but nodes 202 may also be connected in other topologies, e.g., star, grid, or general graph topologies may be used in some examples.

A state manager 204 includes code which upon execution provides transactional distributed lifecycle management of a group 206 of different application-level state providers 208. For clarity of illustration, only a single group 206 of state providers 208 is shown, but a given state manager may manage multiple groups 206. Each group 206 includes state providers in the form of differently structured application program data structures 122. By virtue of the state manager 204 services and controls described herein, these data structures are atomic with respect to one another, are replicated across nodes 202, and are persistent despite operational failure of one or more nodes 202.

In this example, the state manager acts as a key-value store 210 of state providers. The state manager maintains key-value tuples 212 of the form {state provider name, state provider metadata}. State provider metadata includes data used to create a state provider. The state provider name 214 entry in the tuple is assigned by the application developer 104. A state provider ID entry in the tuple is a GUID, index, handle, or other identifier of the state provider 208, and is assigned by the state manager 204.

A state provider 208 may have zero or more child state providers, each of which has a respective child ID 230. For example, a heap state provider may have two child key value stores (each being a state provider in turn), namely, one for the heap's data and the other for the heap's metadata.

A single state provider 208 may also include one or more application level data structures 122, with accompanying metadata such as one or more name(s) and identifiers.

To support state provider replication, at least one node 202 includes a replicator 216. The state manager in the primary node replicates data used to create state providers on one or more secondary nodes. Thus, a system 102 may have a primary replica 218 and one or more secondary replicas 220 based on the primary replica. The node carrying the primary replica is sometimes referred to as the "primary node", while the node(s) that carry secondary replicas are called "secondary nodes". Replicas generally are denoted at 217; 218 denotes primary replicas and 220 denotes secondary replicas. Thus, a system 102 may include a primary replica 218 of a state provider 208 on one node 202 and at least one secondary replica 220 of the same state provider 208 on a different node 202. The state provider may include a corresponding role 232 field to explicitly indicate whether it is on a primary or a secondary node. The state provider may be persistent, by virtue of replication and fault recovery. Thus, a system 102 may include at least two persisted replicas 217 of the same state provider.

To the replicator, the state provider is simply bits; the replicator does not interpret or understand the existence of different state providers or structural differences 222 between state providers or the semantic meaning of the state provider assigned by the application developer. Thus, the replicator is independent of state provider structural differences 222 and semantics of state provider fields, entries, flags, and other data structure data 224 within the application(s) 120 that use a given state provider. Once the data structures 122 are written in state provider form, they are re-usable across different applications. For example, a system 102 may include at least two different applications 120, each of which upon execution accesses the same state provider 208.

Those of skill will acknowledge that replication, transactions, and other functionality discussed herein can be implemented in various ways in various systems. Some database management systems, for example, track database transactions internally in a log which is tailored to relational database operations and contains records in a uniform format page file. In such database systems, data is kept in tables, which are useful but lack the flexibility of data structures 122 generally, e.g., trees, linked lists, and so on. By contrast, in some embodiments provided herein the replicas 217 are not part of a relational database; these embodiments avoid 348 cramming the data structure 122 replicas into a relational database. Similarly, in some embodiments provided herein transactional grouping of state providers is not implemented within a conventional database log. Some embodiments avoid 352 implementations in which data 224 of individual state providers are indexed by row and column. In some embodiments, the state provider controls a checkpoint 234 file 236 format, and the checkpoint file format may depend on the type of state provider and/or be chosen by the state provider, unlike database systems in which a database manager maintains (and dictates formats of) both the log file and the page file.

Differences from other approaches may also be recognized, and may be viewed for convenience as system or process limitations. Thus, those of skill will acknowledge that some examples provided herein have state providers that are not implemented as a sparse multidimensional sorted map. It will also be recognized that in some examples, transactional grouping of state providers is not implemented by a versioned file system. These implementation conditions 346 are satisfied 344 in at least some embodiments.

Systems 102 may also be characterized in other ways. In some, the state providers 208 of interest have persisted after a failover. Some avoid 350 situations in which the individual state providers 208 are logically identical to one another. In some, replication in the system uses 354 a protocol which is unverified in formal concurrent specification languages. Of course, two or more of these characterizations and/or implementation conditions may also be satisfied by a given system 102.

With reference to FIGS. 1 and 2, some embodiments provide a computer system 102 with a logical processor 110 and a memory medium 112 configured by circuitry, firmware, and/or software to provide technical effects such as distributed transactional lifecycle management of diverse application-level data structures as described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data 118 and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, state providers 208 may be on multiple devices/systems 102 in a networked cloud, a log 226 of transactions 228 (e.g., create, delete), may be stored on yet other devices within the cloud, and the state manager 204 may configure the display on yet other cloud device(s)/system(s) 102 with an enumeration of state provider groups 206.

Processes

Figure 3:
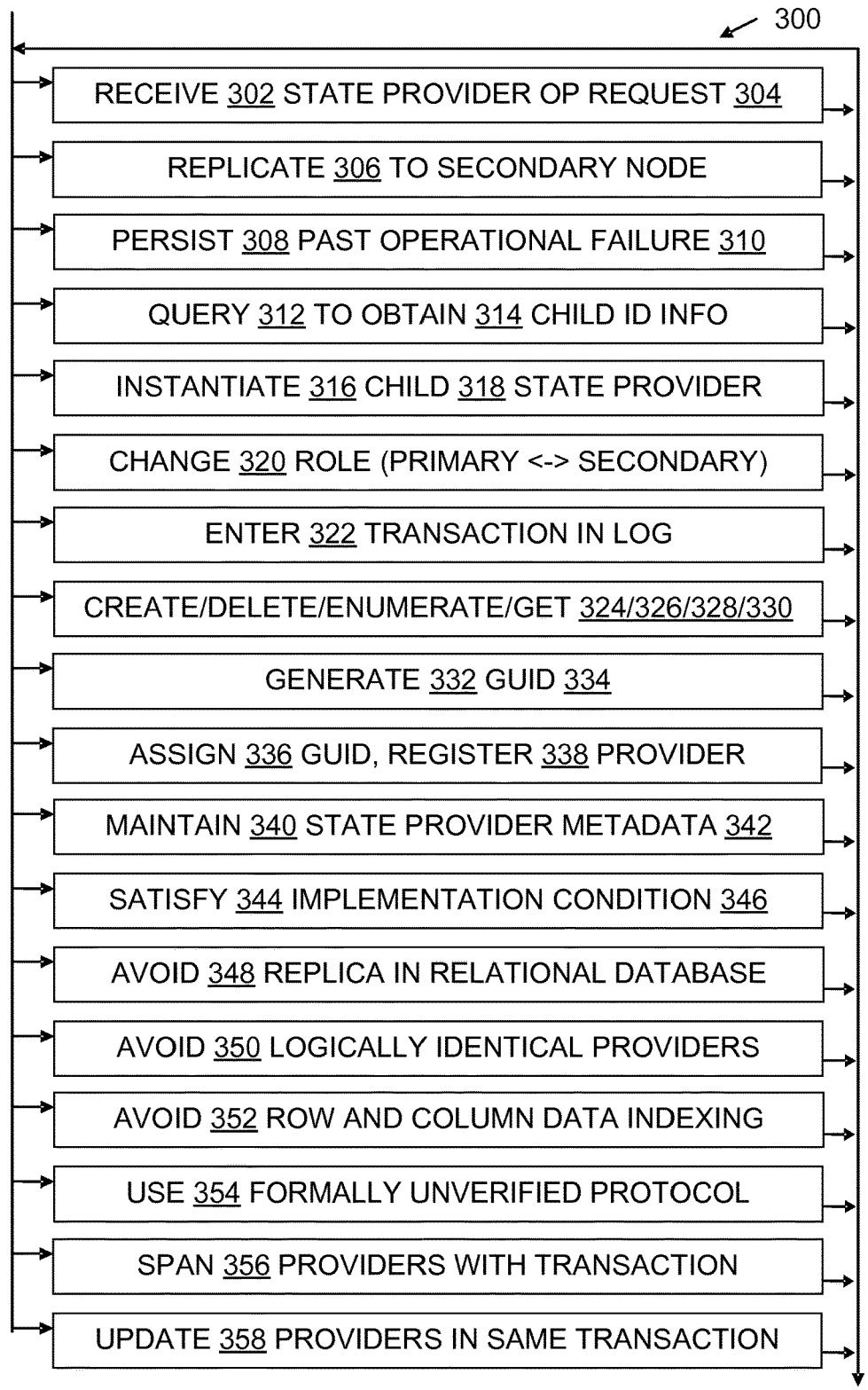
FIG. 3 is a flow chart illustrating steps of some process and configured storage medium embodiments.

FIG. 3 illustrates some process embodiments in a flowchart 300. Technical processes shown in the Figures or otherwise disclosed may be performed in some embodiments automatically, e.g., by a state manager 204 distributed service requiring little or no contemporaneous live user input aside from state provider creation, deletion, or enumeration requests. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

During a creation process, as viewed from the system's point of view, a state provider instance is created. In embodiments which support child state providers, and in situations in which a given state provider has one or more children to be instantiated, instances of those children are also created. In some other embodiments, children state providers are not supported, and creation may therefore be done without checking whether any state provider children are involved. Regardless, instantiation may include a state manager receiving 302 a state provider creation request 304 at a primary node in a distributed network 108 of computing nodes. The request 304 requests creation of a transactional distributed state provider 208 as a member of a group 206 of different application-level state providers which include differently structured application program data structures that are atomic with respect to one another. The group may be explicitly or implicitly created with the creation of the first state provider of the group. This creation process also includes replicating 306 the state provider to at least one secondary node of the distributed network.

The creation process may also include persisting 308 the state provider past an operational failure 310 of at least one of the computing nodes. If the state provider's primary replica 218 survived the operational failure, that provides persistence, but at least one secondary replica 220 will typically also be created by the replicator if none survived. If the primary replica did not survive the operational failure, but at least one secondary replica survived, then the first located secondary replica (or most central replica, or replica on the least loaded node, etc.) can change roles 232 from secondary to primary, and then the process continues as noted above for the situation in which the primary replica survived.

In embodiments which support state provider children, the process also includes the state manager querying 312 the state provider to obtain 314 any state provider child identification information 230. When one or more children 318, 208 of the queried state provider are identified, the system instantiates 316 them after obtaining 314 the state provider child identification information. An instantiated child may be replicated 306 to at least one secondary node 202 of the distributed network, and persisted 308 past operational failure(s) 310.

In some embodiments, the state manager lets transactions 228 span 356 across multiple state providers 208. The state manager may perform at least one of the following acts in a transaction which spans across multiple state providers: changing 320 state provider roles 232 between a primary role and a secondary role; entering 322 the transaction in a write-ahead log 226.

In some embodiments, the state manager lets applications 120 dynamically create 324 and delete 326 state providers transactionally. Thus, a process may include the state manager coordinating at least one of the following during a runtime period of an application program in response to a request from the application program: transactionally creating 324 a state provider; transactionally deleting 326 a state provider. In some, the process includes one or more of the following: creation of a state provider, deletion of a state provider or supporting operation on a state provider, or a lifecycle operation on the state provider. In some embodiments, any operation to be performed on a state provider 208 goes through the state manager 204 before getting logged or replicated, since the replicator 216 does not understand state providers. In these embodiments, the state manager 204 is the only component that interacts with the transactional replicator 216.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as a state manager 204 and a group 206 of state providers 208, in the form of data 118 and instructions 116, read from a removable medium 114 and/or another source such as a network connection, to form a configured medium. The configured medium 112 is capable of causing a computer system to perform technical process steps for transactional distributed lifecycle management of a group of diverse but semantically related application-level data structures as disclosed herein. The figures thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Some embodiments include lifecycle management process software stored on a disk, in memory, or in another computer-readable storage medium 112. A computer-readable storage medium may be configured with data 118, 122, 208 and with instructions 116, 204, 216 that when executed by at least one processor 110 causes the processor(s) to perform a technical process for state provider lifecycle management.

In some cases, lifecycle operations that are requested directly by an application 120 include create 324, delete 326, enumerate 328, and get 330. In some examples, the process performed by execution of instructions 116 includes a state manager receiving 302 a state provider lifecycle management request at a node in a distributed network of computing nodes, namely, a request 304 for at least one of the following lifecycle operations: (a) creation 324 of a transactional distributed state provider as a member of a group of different application-level state providers which include differently structured application program data structures, (b) deletion 326 of a previously created transactional distributed state provider, (c) enumeration 328 of any previously created transactional distributed state providers. In some examples, the process includes replicating 306 at least one state provider to at least one secondary node of the distributed network 108. In some examples, the process includes persisting 308 at least one state provider past an operational failure of at least one of the computing nodes.

A GUID may be used as an identifier in some examples. Some processes include the state manager generating 332 a GUID 334 and assigning 336 the GUID to a state provider as a part of registering 338 the state provider with the state manager. The GUID may be entered in the key-value store 210 as the state provider identifier. In some embodiments, a GUID identifier 334 is maintained because deletes are soft deletes and the GUID identifier supports scenarios where a user 104 wants a delete a state provider and then create another state provider 208 with the same name 214.

Figure 4:
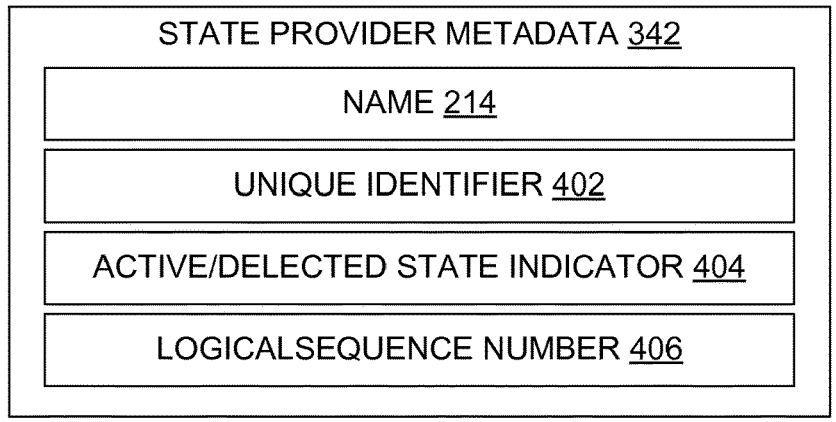
FIG. 4 is a block diagram illustrating aspects of state provider metadata.

State providers may also have metadata 342, as illustrated in FIG. 4. In some examples, the state manager maintains 340 at least the following state provider metadata: a state provider name 214 provided by an application program, a state provider identifier 402 which is unique within all replicas 217 of the state provider that are accessed by the state manager (e.g., a GUID), a state provider state indicator 404 which distinguishes an active state from a deleted state, and a state provider creation logical sequence number 406.

As an example of a state provider that might be used often, consider a queue data structure 122. In some embodiments, the state manager operates as a key value store of state providers. A queue state provider may have two child key value stores (each being a state provider in turn)—one for the queue's data and the other for the queue's metadata. For instance, the state manager may receive a creation request for a queue state provider, after which the process further includes the state manager using a first key value store for data 118 of the queue and using a second key value store for metadata of the queue. Alternately, some embodiments implement queues (and at least some other data structures) as state provider using monolithic state provider structure in which the data 224 written and read by the application(s) is stored in the same structure as the metadata 342. However, measures are taken to prevent the application from accidentally or intentionally overwriting the metadata 402, 404, 406. It will be appreciated that in the foregoing example a queue state provider chose (via developer implementation choices) to have two children state providers, with two key value stores where a key value store is a state provider. This decision is orthogonal to the state manager 204. The state manager will create all the children state providers when trying to create this queue, by querying the queue state provider to return any children's information and in turn creating all of the identified children. Queues can also be implemented differently, without children.

In some embodiments, the state manager performs a transactional soft delete 326 of a state provider in response to the request for deletion of a previously created transactional distributed state provider.

Figure 5:
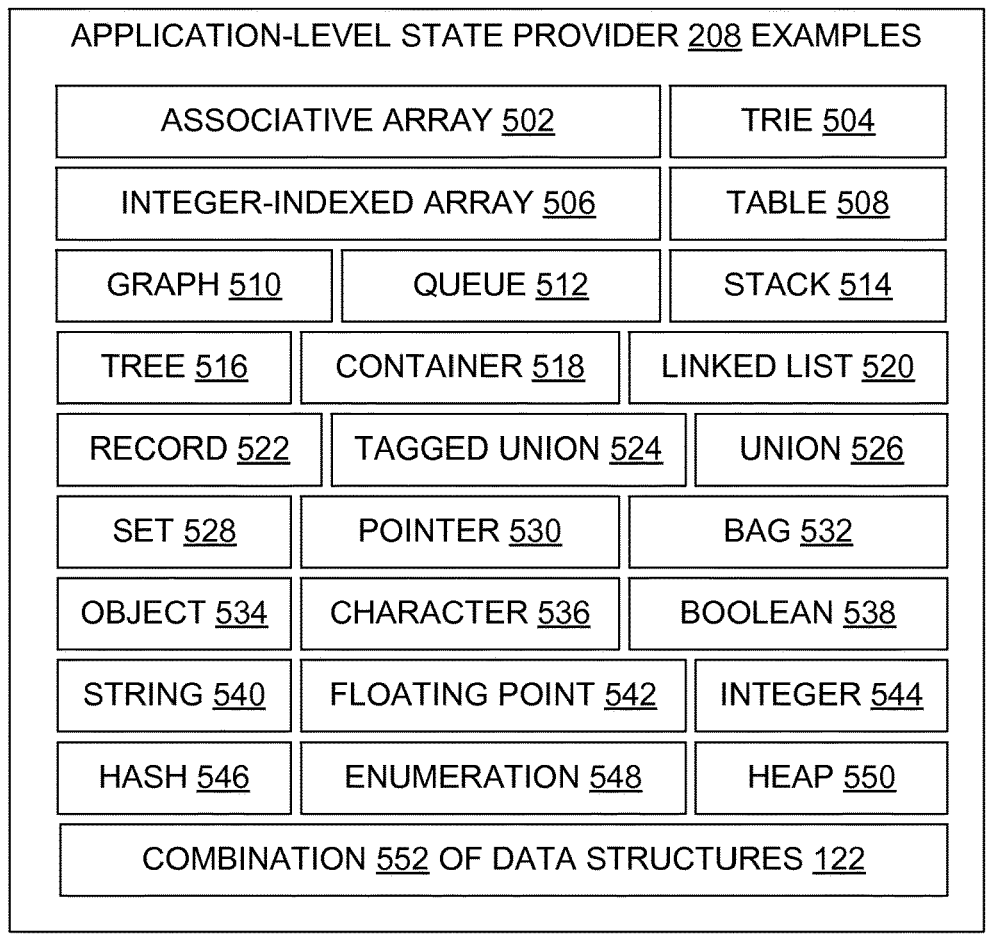
FIG. 5 is a block diagram illustrating examples of application-level state providers.

FIG. 5 illustrates some of the many examples of state providers 208, which derive their names here from the corresponding familiar data structures 122 (which lack the transactional grouping, persistence, and other characteristics of state providers 208). These examples include an associative array 502, trie 504, integer-indexed array 506, table 508, graph 510, queue 512, stack 514, tree 516, container 518, linked list 520, record 522, tagged union 524, union 526, set 528, pointer 530, bag 532, object 534, character 536, Boolean 538, string 540, floating point 542, integer 544, hash 546, enumeration 548, heap 550, and combinations 552 of these and/or other data structures, any or all of which are enhanced by distributed transactionality, replication, persistence, and/or accessibility to multiple applications via name/ID, as described herein, to become state providers 208. Those of skill will recognize that the number of ways to group two or more diverse data structures 122 as part of a single state provider 208, or in the form of respective multiple state providers 208, is very large. However, as illustration the following examples are provided of ways a state manager may create a state provider as a member of transactional distributed groups of different application-level state providers:

(i) a group including an associative array and an integer-indexed array;
(ii) a group including an integer-indexed array and a tree;
(iii) a group including an integer-indexed array and a queue;
(iv) a group including an integer-indexed array and a stack;
(v) a group including an integer-indexed array and a table;
(vi) a group including an integer-indexed array and a linked list;
(vii) a group including a tree and a queue;
(viii) a group including a tree and a table;
(ix) a group including a tree and a linked list;
(x) a group including a table and a linked list;
(xi) a group including a graph and a queue;
(xii) a group including a container and a linked list;
(xiii) a group including a container and a tree;
(xiv) a group including a container and an integer-indexed array.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived in part from Reliable Collections documentation. Reliable Collections™ software for the Azure™ environment is implemented by Microsoft Corporation (marks of Microsoft). Aspects of the Reliable Collections or other the Azure software and/or documentation are consistent with or otherwise illustrate aspects of the embodiments described herein. However, it will be understood that Reliable Collections or Azure documentation and/or implementation choices do not necessarily constrain the scope of such embodiments, and likewise that Reliable Collections or Azure and/or its documentation contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

In some examples, the contents of a state provider creation request 304 include name 214, ID 402, and any initialization parameters that the state provider might use.

In some examples, snapshot reads are supported to fetch the state providers for children.

In some examples, querying for the state provider means querying the state manager for state provider metadata. The state provider includes a list, or tree, or dictionary, or whatever other data structure is defined by the application developer, whereas the querying and the metadata are transparent to the application developer. That is, the application developer can query the state manager for the data structures that they have registered with it.

In some examples, the ID 402 is a random GUID that is generated by the state manager and assigned as a part of registering the state provider with the state manager. The ID is generated to uniquely identify a state provider. After a state provider is deleted, it can be created with the same name. Since delete is a soft delete, an ID is needed for uniqueness. The ID in the state provider metadata is not generally visible to the application developer. However, the ID is exposed to the state provider at creation time. For tracing purpose it could be exposed to the application layer as well. The system though keeps track of these IDs in its state as well, since they are used for debugging/monitoring/tracing.

In some examples, in the state provider metadata, "active state" indicates state providers that have not been deleted, and "deleted state" indicates state providers that have been deleted. Note that the delete is a soft-delete, namely, the state is changed but the associated data is saved for a period in case the state provider is subsequently undeleted. The state manager uses these states. Every state provider is in an active state upon creation. When a delete request comes, it is set to the delete state. In some embodiments, the set of states that a state provider can be in is extended. There could be cases where it is helpful to know what role the state providers are in, since when roles change some state providers will succeed changing their role, but others might not. Since the system will retry that operation, only the ones that failed the first time around will be asked to change role again.

In some embodiments, the LSN 406 in the state provider metadata, comes from the replicator. The same logical sequence number is used in the log 226 as well. Some examples use more than one LSN per state provider, e.g., a CreateLSN is the LSN associated with the create operation and a DeleteLSN is the LSN associated with the delete operation. The replicator 216 generates the LSNs. Each LSN is unique to a replication operation. LSNs are not changed during normal operation of the system. In some examples, LSNs are exposed to the application layer at different levels: APIs, method calls, backup, etc. Each LSN represents a state mutation in a state provider that is replicated in the replica set for high availability.

In some embodiments, the state manager technology is different than a conventional distributed database log in that the state manager operates as a key-value store of state providers, and its transactions are written to a write ahead log.

In some embodiments, the state manager technology is different than a thread grabbing a lock and then creating different data structures in that state manager technology is focused on providing distributed access to the state providers, not merely a single process's data structures.

As another example, assume there are two dictionaries: dictionary1 contains employee id and employee name, while dictionary2 contains employee name and position. Any time a new employee is added, both the dictionaries should be updated 358 in the same transaction. For instance, adding a new employee named Harry might look like this:

```
Tx
{
// Insert into dictionary1(1234, "Harry")
// Insert into dictionary2("Harry", "Marketing Manager")
// commit
}
```

In the above case both the dictionaries are updated in the same transaction. Some examples support a hierarchy of data structures, e.g., a dictionary of dictionaries.

Some embodiments provide a state manager as a highly available container for data structures, and data structure life cycle management supporting asynchronous and transactional data structures.

In some examples, a state manager 204 permits the replicator to interact with multiple state providers 208 and lets them share the same transaction. The state manager manages the lifecycle of state providers. It acts as a key-value store of state providers (state provider name, state provider) and ensures that they are persisted across failovers. The state manager multiplexes and de-multiplexes information between the replicator and the state provider, since the replicator does not understand the existence of different state providers.

As a store 210 of state providers, in some embodiments the state manager supports creation, deletion, enumeration, and get operations.

As to creation of state providers, a state provider create request is submitted on the primary. It queries for its children from the state provider and instantiates them, if any, in a depth first fashion. Type and other initialization information are replicated to the secondaries and state provider instances are created on the secondaries. On commit, state provider metadata information used to create them is persisted.

As to enumeration/get, these return all/a selected one of the committed state providers.

As to deletion, a delete workflow is similar to the create workflow, where the state provider along with its children are deleted. Deletion involves removing the persisted state of the state providers permanently. Since this is a physical operation, it cannot be undone once it has been deleted. If this operation runs into a false progress, then it should be undone. So a delete request on commit is a soft-delete; once the operation becomes stable (when false progress cannot happen anymore), the state provider is hard-deleted. If there is a copy operation in progress on the state provider to be deleted, hard-delete is delayed until the copy completes. If there is a false progress following soft-deletion, the state provider is resurrected.

In some embodiments, a state manager also manages the state provider life cycle, including Constructor, Initialize, Open, Recover, Change role, Copy, Checkpoint/Apply/Unlock, and Close/abort operations, for example.

As to Change role, whenever there is a change role on the state manager (from the failover), change role is subsequently called on all the state providers. It is also called during the initial creation of a state provider so that the state provider is in the same role as the replica. A system may retry on change role if some of the state providers succeed and some of them fail to complete change role.

As to Recovery, this operation recovers the state manager first and creates all the state providers, then hydrates all the state providers and recovers the replicator. As each operation is being replayed by the replicator during its recovery, state manager routes it to the correct state provider based on the name it stores in the redo/undo information. When an operation pertaining to a deleted state provider is replayed, state manager no-ops it as it maintains the list of a deleted state provider until the replicator would no longer replay operations pertaining to the deleted state provider.

As to Copy, on copy a state manager first copies itself so that it can instantiate the state providers and then invokes copy on all the state providers. Copy is not called on state providers that have been deleted.

Hierarchy information is persisted in some examples, such that life cycle APIs are invoked hierarchically on the state providers (parent to child).

As to replication, a state manager replicates creation/deletion of state providers and operations on state providers seamlessly across multiple nodes in some embodiments. As to persistence, state providers are persisted providing resilience to failures.

As discussed and illustrated herein, some embodiments provide support for a transaction to span across different state providers. Some support dynamically creating and deleting state providers transactionally. Some support some or all of the following lifecycle management operations on state providers: Initialize, Open, Recover, Change role, Copy, Apply/Unlock, Checkpoint, Abort/Close.

Figure 6:
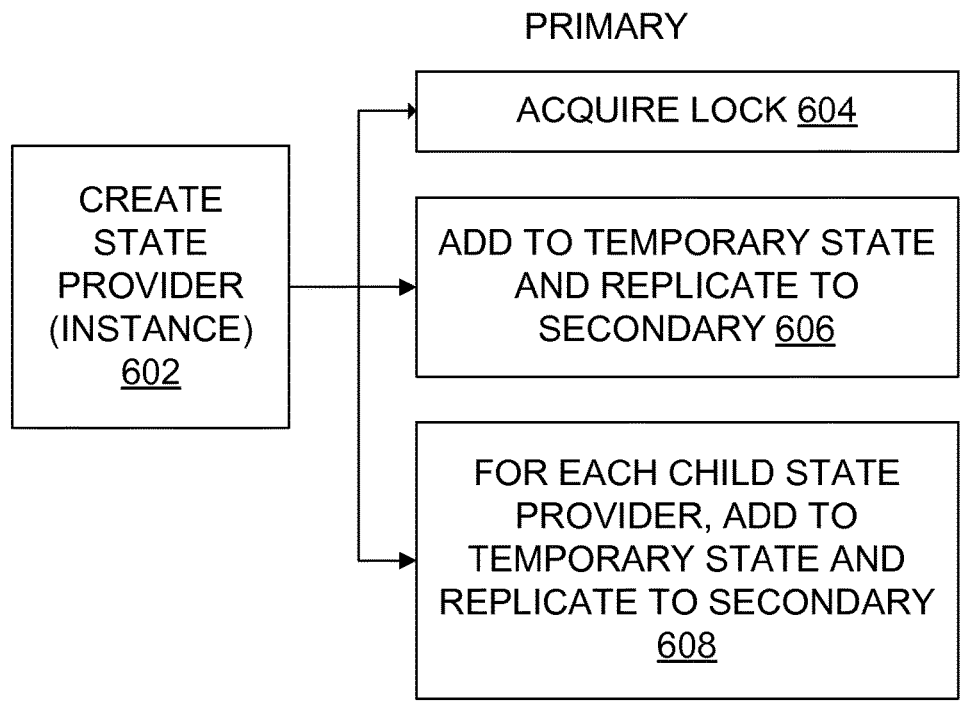
FIG. 6 is a flow chart illustrating state provider instance creation steps on a primary node of a distributed system.
Figure 7:
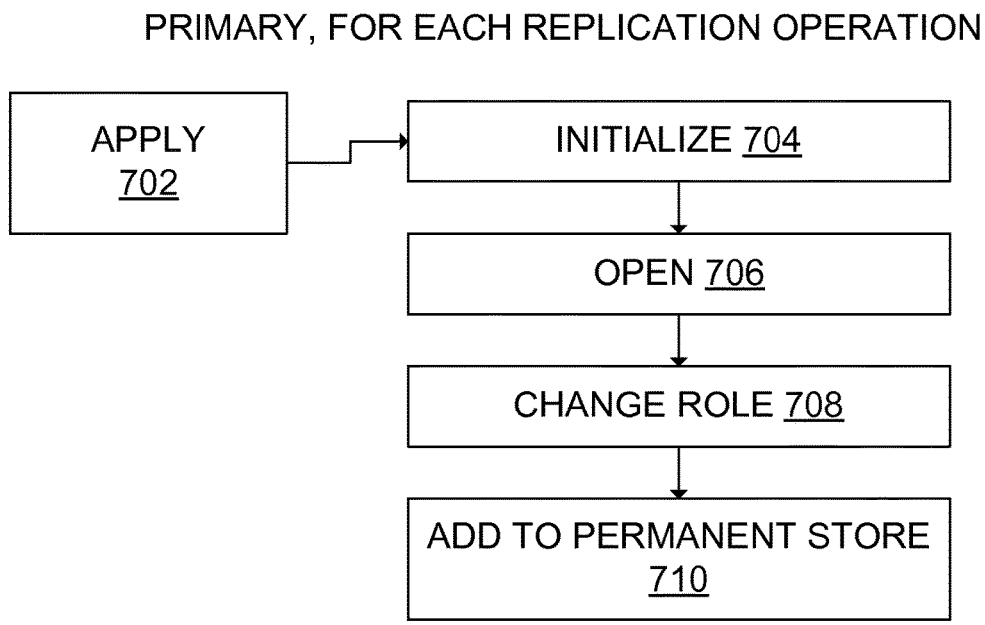
FIG. 7 is a flow chart illustrating actions of an apply step on a primary node during replication in the distributed system.
Figure 8:
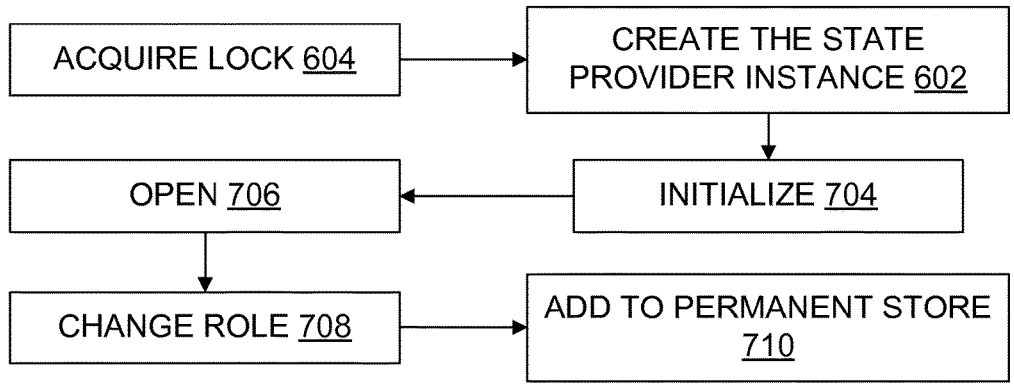
FIG. 8 is a flow chart illustrating actions of the apply step on a secondary node during replication in the distributed system.
Figure 9:
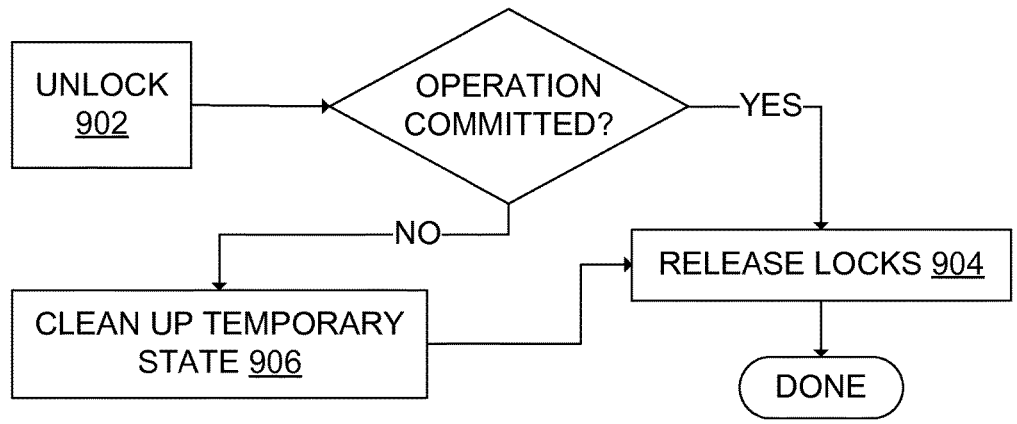
FIG. 9 is a flow chart illustrating actions of an unlock step on the primary node during replication in the distributed system.
Figure 10:
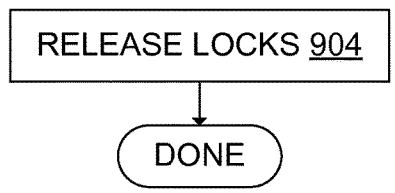
FIG. 10 is a flow chart illustrating actions of the unlock step on the secondary node during replication in the distributed system.
Figure 11:
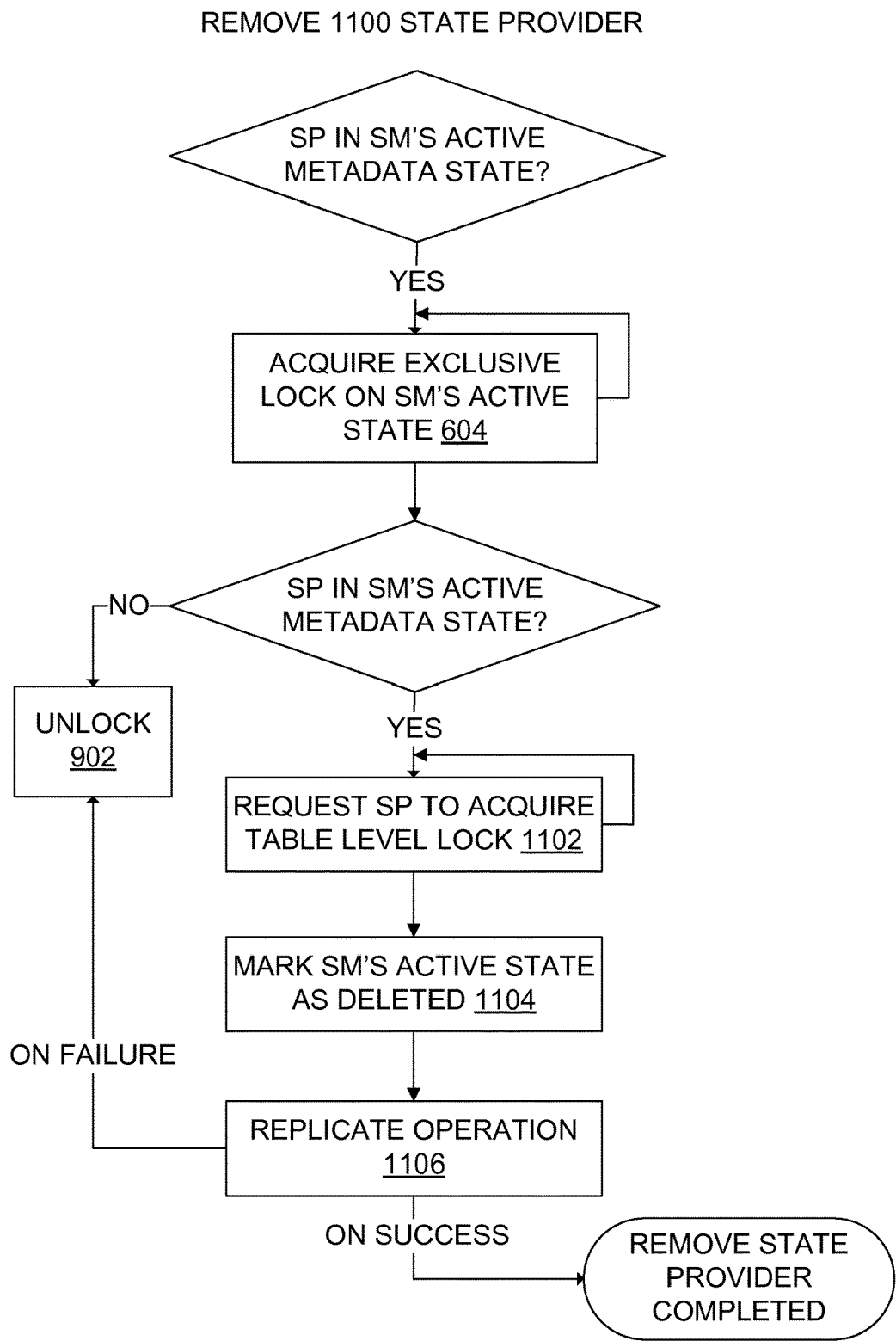
FIG. 11 is a flow chart illustrating steps to remove a state provider.
Figure 12:
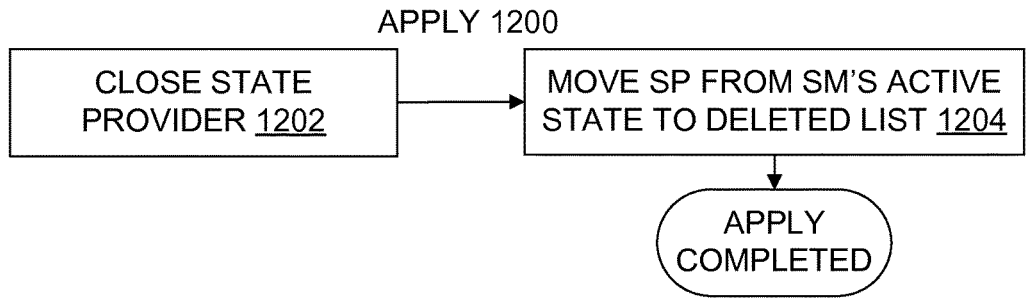
FIG. 12 is a flow chart illustrating an apply step in connection with removing a state provider.
Figure 13:
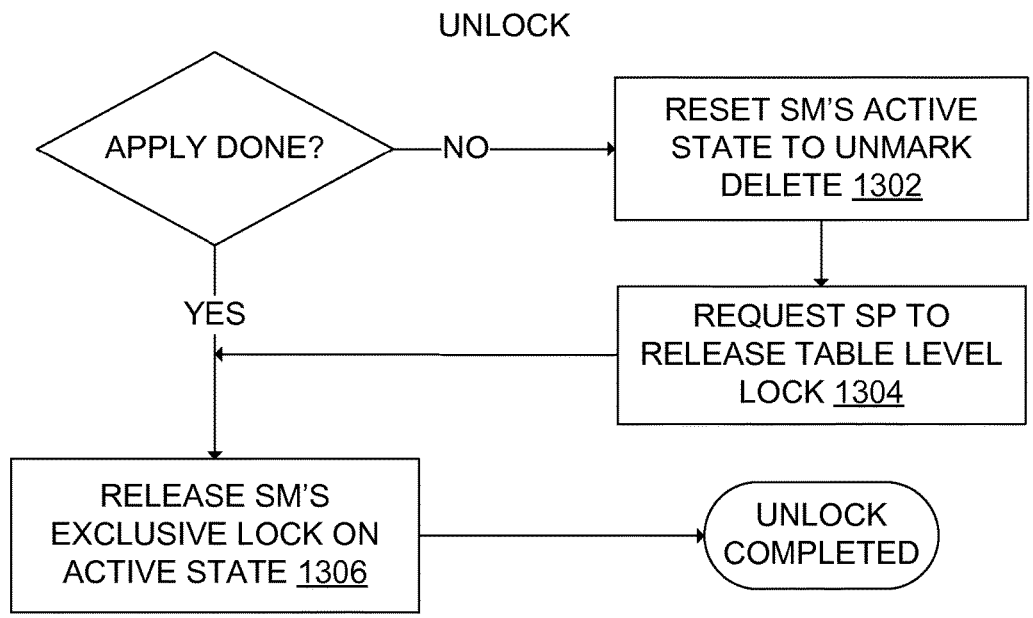
FIG. 13 is a flow chart illustrating an unlock step in connection with removing a state provider.
Figure 14:
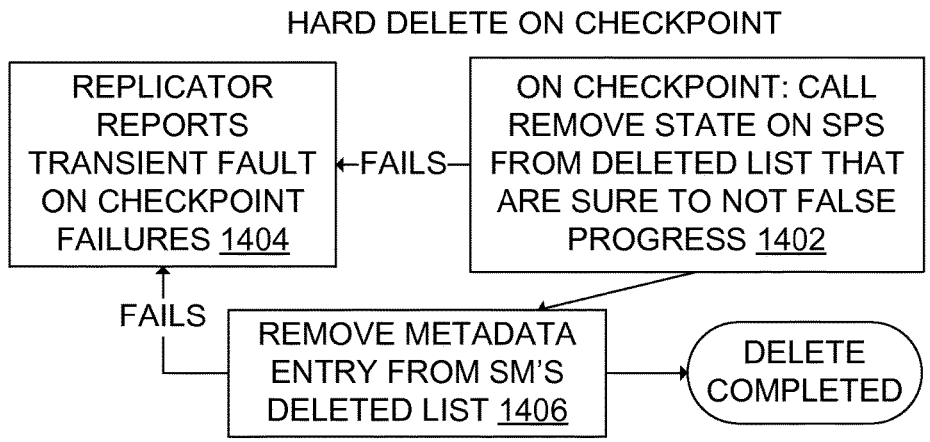
FIG. 14 is a flow chart illustrating a hard delete on a checkpoint in connection with removing a state provider.

FIGS. 6 through 14 illustrate some aspects of one implementation. Embodiments are not limited to these particular details, and may include aspects not detailed in these particular figures. FIG. 6 is a flow chart whose steps 602, 604, 606, 608 illustrate state provider instance creation 324 steps on a primary node 202 of a distributed system 102. FIG. 7 is a flow chart illustrating an apply step 702, and constituent sub-steps 704, 706, 708, 710, on a primary node during replication 306. FIG. 8 is a flow chart illustrating the apply step on a secondary node during replication. FIG. 9 is a flow chart illustrating actions 904, 906 of an unlock step 902 on the primary node during replication; FIG. 10 is a flow chart illustrating the unlock step on the secondary node during the replication. FIG. 11 is a flow chart illustrating steps 1102, 1104, 1106, and others to remove 1100 a state provider. FIG. 12 is a flow chart illustrating an apply step 1200 and sub-steps 1202, 1204 in connection with removing a state provider. FIG. 13 is a flow chart illustrating an unlock step and sub-steps 1302, 1304, 1306 and others in connection with removing a state provider. FIG. 14 is a flow chart illustrating a hard delete on a checkpoint and steps 1402, 1404, 1406 in connection with removing a state provider.

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system, comprising:
a processor;
a memory; and
a state manager stored in the memory and configured to operate as a key-value store of state providers of a distributed network, wherein the distributed network comprises a plurality of nodes, and wherein the state manager includes instructions, which are executable by the processor to provide transactional distributed lifecycle management including
   maintaining key-value tuples of state provider names, state provider data, and state provider metadata in the memory, wherein the state provider metadata is used to create the state providers,
   writing transactions performed by the state manager in a write ahead log, which is stored in the memory,
   receiving a request to create one of the state providers,
   creating the one of the state providers, based on a corresponding one of the key-value tuples, to be a member of a group of different application-level state providers that include different structured application program data structures, which are atomic with respect to one another,
   replicating the metadata of the one of the state providers to provide (i) a primary replica at a primary node, and (ii) a secondary replica at a secondary node,
   persisting the primary replica and the secondary replica past an operational point of failure at one of the plurality of nodes of the distributed network, and
   based on a state of the primary replica and a state of the secondary replica subsequent to the failure at the one of the plurality of nodes, (i) switching roles between the primary replica and the secondary replica, and (ii) prior to switching the roles, recording this role switching transaction in the write ahead log.

2. The system of claim 1, wherein:
the system satisfies at least one of a plurality of conditions; and
the plurality of conditions comprise
   transactional grouping of the state providers is not implemented within a database-system-dictated page file format,
   the state providers are not implemented as a sparse multidimensional sorted map,
   transactional grouping of the state providers is not implemented by a versioned file system, and
   the replicas are not part of a relational database.

3. The system of claim 1, wherein:
the system satisfies at least two of a plurality of conditions; and
the plurality of conditions comprising
   the state providers being persisted after a failover;
   the state providers are not logically identical to one another;
   data of each of the state providers is not indexed by row and column; and
   replication in the system corresponds to a protocol, which is unverified in formal concurrent specification languages.

4. The system of claim 1, wherein the instructions are configured to query the one of the state providers to obtain any state provider child identification information.

5. The system of claim 4, wherein the instructions are configured to:
- instantiate at least one child of the one of the state providers after obtaining state provider child identification information;
- replicate the at least one instantiated child to at least one the secondary node or another secondary node of the distributed network; and
- persist the at least one instantiated child past an operational failure.

6. The system of claim 1, further comprising the state manager coordinating during a runtime period of an application program in response to a request from the application program:
- transactionally creating one of the state providers; and
- transactionally deleting one of the state providers.

7. The system of claim 1, wherein the state manager includes instructions configured to provide the plurality of nodes with distributed access to the state providers.

8. The system of claim 1, wherein the state manager includes instructions configured to:
- query the one of the state providers to obtain state provider child identification information;
- identify one or more children of the one of the state providers;
- facilitate replicating of the one or more children; and
- persist the one or more replicas of the one or more children past the operational point of failure at the one of the plurality of nodes.

9. The system of claim 1, wherein the state manager includes instructions configured to permit applications to create and delete state providers.

10. The system of claim 1, wherein the state manager includes instructions configured to, while an application is running:
- receive a request from the application to create a first state provider; and
- delete or support an operation of a second state provider.

11. The system of claim 1, further comprising:
- a first node comprising the memory and the processor; and
- a first replicator stored in the memory and including instructions, which are executable by the processor and configured to, based on the metadata for the one of the state providers, replicate the one of the state providers to provide one of the primary replica or the secondary replica.

12. The system of claim 11, further comprising:
- a second node comprising a memory and a processor; and
- a second replicator stored in the memory of the second node and including instructions, which are executable by the processor of the second node and configured to, based on the metadata of the one of the state providers, replicate the one of the state providers to provide the other one of the primary replica or the secondary replica.

13. The system of claim 1, wherein the state manager includes instructions configured to switch a role of at least one of the primary replica or the secondary replica a second time if at least one of the primary replica or the secondary replica fails.

14. A computer-readable storage medium configured with data and with a state manager, wherein the state manager is configured to operate as a key-value store of state providers of a distributed network, wherein the distributed network comprises a plurality of nodes, and wherein the state manager includes instructions that when executed by a processor causes the processor to perform a process for state provider lifecycle management, the instructions configured to:
- maintain key-value tuples of state provider names, state provider data, and state provider metadata in the computer-readable storage medium, wherein the state provider metadata is used to create the state providers;
- write transactions performed by the state manager in a write ahead log, which is stored in the computer-readable storage medium;
- receive a request to create one of the state providers;
- create the one of the state providers, based on a corresponding one of the key-value tuples, to be a member of a group of different application-level state providers that include different structured application program data structures, which are atomic with respect to one another;
- replicate the metadata of the one of the state providers to provide (i) a primary replica at a primary node, and (ii) a secondary replica at a secondary node;
- persist the primary replica and the secondary replica past an operational point of failure at one of the plurality of nodes of the distributed network; and
- based on a state of the primary replica and a state of the secondary replica subsequent to the failure at the one of the plurality of nodes, (i) switch roles between the primary replica and the secondary replica, and (ii) prior to switching the roles, record this role switching transaction in the write ahead log.

15. The computer-readable storage medium of claim 14, wherein the instructions are further configured to have the state manager generate a graphical user identifier and assign the graphical user identifier as a part of registering the one of the state providers with the state manager.

16. The computer-readable storage medium of claim 14, wherein the instructions are further configured to have the state manager maintain at least the following metadata:
- a state provider name provided by an application program;
- a state provider identifier which is unique within all replicas of the one of the state providers accessed by the state manager;
- a state provider state indicator, which distinguishes an active state from a deleted state; and
- a state provider creation logical sequence number.

17. The computer-readable storage medium of claim 14, wherein the instructions are further configured to have the state manager:
- receive a creation request for the one of the state providers;
- use a first key value store for data of the one of the state providers; and
- use a second key value store for metadata of the one of the state providers.

18. The computer-readable storage medium of claim 14, wherein the instructions are further configured to have the state manager perform a transactional soft delete of one of the state providers in response to a request for deletion of a previously created transactional distributed state provider.

19. The computer-readable storage medium of claim 14, wherein the state manager operates as a key value store of the state providers.

20. The computer-readable storage medium of claim 14, wherein the instructions are further configured to have the state manager create the one of the state providers with at least one of the following transactional distributed groups of different application-level data structures:

(i) a group including an associative array and an integer-indexed array;
(ii) a group including an integer-indexed array and a tree;
(iii) a group including an integer-indexed array and a queue;
(iv) a group including an integer-indexed array and a stack;
(v) a group including an integer-indexed array and a table;
(vi) a group including an integer-indexed array and a linked list;
(vii) a group including a tree and a queue;
(viii) a group including a tree and a table;
(ix) a group including a tree and a linked list;
(x) a group including a table and a linked list;
(xi) a group including a graph and a queue;
(xii) a group including a container and a linked list;
(xiii) a group including a container and a tree; or
(xiv) a group including a container and an integer-indexed array.

21. A method, comprising operating a state manager as a key-value store of state providers of a distributed network, wherein the distributed network comprises a plurality of nodes, and wherein the state manager includes instructions, which are executable by a processor are configured to:

maintaining key-value tuples of state provider names, state provider data, and state provider metadata in a memory, wherein the state provider metadata is used to create the state providers;
writing transactions performed by the state manager in a write ahead log, which is stored in the memory;
receiving a request to create one of the state providers;
creating the one of the state providers, based on a corresponding one of the key-value tuples, to be a member of a group of different application-level state providers that include different structured application program data structures, which are atomic with respect to one another;
replicating the metadata of the one of the state providers to provide (i) a primary replica at a primary node, and (ii) a secondary replica at a secondary node;
persisting the primary replica and the secondary replica past an operational point of failure at one of the plurality of nodes of the distributed network; and
based on a state of the primary replica and a state of the secondary replica subsequent to the failure at the one of the plurality of nodes, (i) switching roles between the primary replica and the secondary replica, and (ii) prior to switching the roles, recording this role switching transaction in the write ahead log.

* * * * *